United States Patent
Abdelhadi et al.

(10) Patent No.: US 7,085,801 B1
(45) Date of Patent: Aug. 1, 2006

(54) METHOD AND APPARATUS FOR PRINTING WEB PAGES

(75) Inventors: Sanaa F. Abdelhadi, Austin, TX (US); Maritza Borunda, Austin, TX (US); Hypatia Rojas, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 1090 days.

(21) Appl. No.: 09/444,121

(22) Filed: Nov. 19, 1999

(51) Int. Cl.
*G06F 15/16* (2006.01)
*G06F 17/00* (2006.01)

(52) U.S. Cl. .................... 709/201; 715/513; 707/100
(58) Field of Classification Search ............. 707/517, 707/104.1, 523, 103, 104, 100; 709/219, 709/201, 231, 245; 358/1.15
See application file for complete search history.

(56) References Cited

U.S. PATENT DOCUMENTS

| | | | | |
|---|---|---|---|---|
| 6,029,182 A * | 2/2000 | Nehab et al. | ............... | 707/523 |
| 6,061,700 A * | 5/2000 | Brobst et al. | ............... | 707/517 |
| 6,209,030 B1 * | 3/2001 | Ohashi | ....................... | 709/219 |
| 6,222,634 B1 * | 4/2001 | Dubbels et al. | ............ | 358/1.15 |
| 6,282,549 B1 * | 8/2001 | Hoffert et al. | ........... | 707/104.1 |
| 6,314,432 B1 * | 11/2001 | Potts, Jr. | ................... | 707/104.1 |

FOREIGN PATENT DOCUMENTS

GB 2332543 * 6/1999

* cited by examiner

*Primary Examiner*—William Bashore
*Assistant Examiner*—Chau Nguyen
(74) *Attorney, Agent, or Firm*—Duke W. Yee; Diana R. Gerhardt; Patrick C. R. Holmes

(57) ABSTRACT

A method and apparatus in a data processing system for printing web pages. A request to print a web page is received. The web page is printed and each web page associated with the web page on selected levels below the web page.

34 Claims, 6 Drawing Sheets

PRINT LEVEL 1

FROM FIG. 5a

PRINT LEVEL 2

METHOD AND APPARATUS FOR PRINTING WEB PAGES

BACKGROUND OF THE INVENTION

1. Technical Field

The present invention relates generally to an improved data processing system and in particular to a method and apparatus for outputting data to a device. Still more particularly, the present invention provides a method and apparatus for printing Web pages containing links.

2. Description of Related Art

The Internet, also referred to as an "internetwork", is a set of computer networks, possibly dissimilar, joined together by means of gateways that handle data transfer and the conversion of messages from the sending network to the protocols used by the receiving network (with packets if necessary). When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Identifier (URI) such as a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by a URL at the client machine. Retrieval of information on the Web is generally accomplished with an HTML-compatible browser.

In some cases, a user may desire to obtain a hard copy of one or more Web pages. In many cases, the user may desire to print out a copy of an article or some other content on a Web site. In some cases, the entire article or the desired content may be printed all at once. In other cases, the article or desired content may be divided up into many different pages which are linked to each other by URLs. In this situation, the user must print a page. This page may contain a number of links pointing to other pages containing other portions of the article or desired content. Each of these links must be visited by the user and then printed. Such a process becomes tedious and difficult when large number of links are present.

Therefore, it would be advantageous to have an improved method and apparatus for printing web pages.

SUMMARY OF THE INVENTION

The present invention provides a method and apparatus in a data processing system for printing web pages. A request to print a web page is received. The web page is printed and each web page associated with the web page on selected levels below the web page also are printed.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
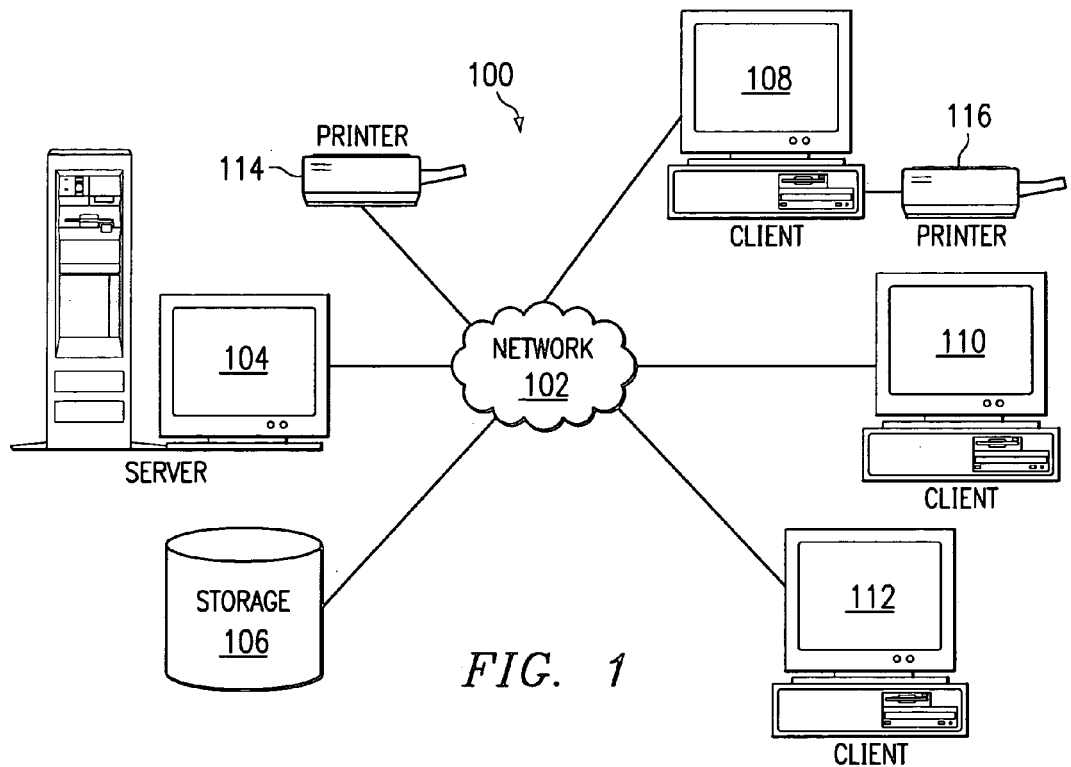
FIG. 1 depicts a pictorial representation of a distributed data processing system in which the present invention may be implemented.

With reference now to the figures, FIG. 1 depicts a pictorial representation of a distributed data processing system in which the present invention may be implemented. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, clients 108, 110, and 112 also are connected to network 102. These clients 108, 110, and 112 may be, for example, personal computers or network computers. For purposes of this application, a network computer is any computer, coupled to a network, which receives a program or other application from another computer coupled to the network. In the depicted example, server 104 provides data, such as boot files, operating system images, and applications to clients 108–112. Clients 108, 110, and 112 are clients to server 104. Web pages and other contents may be printed in a hard copy form using printers, such as printers 114 and 116. The printing may take place locally or remotely.

Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, distributed data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
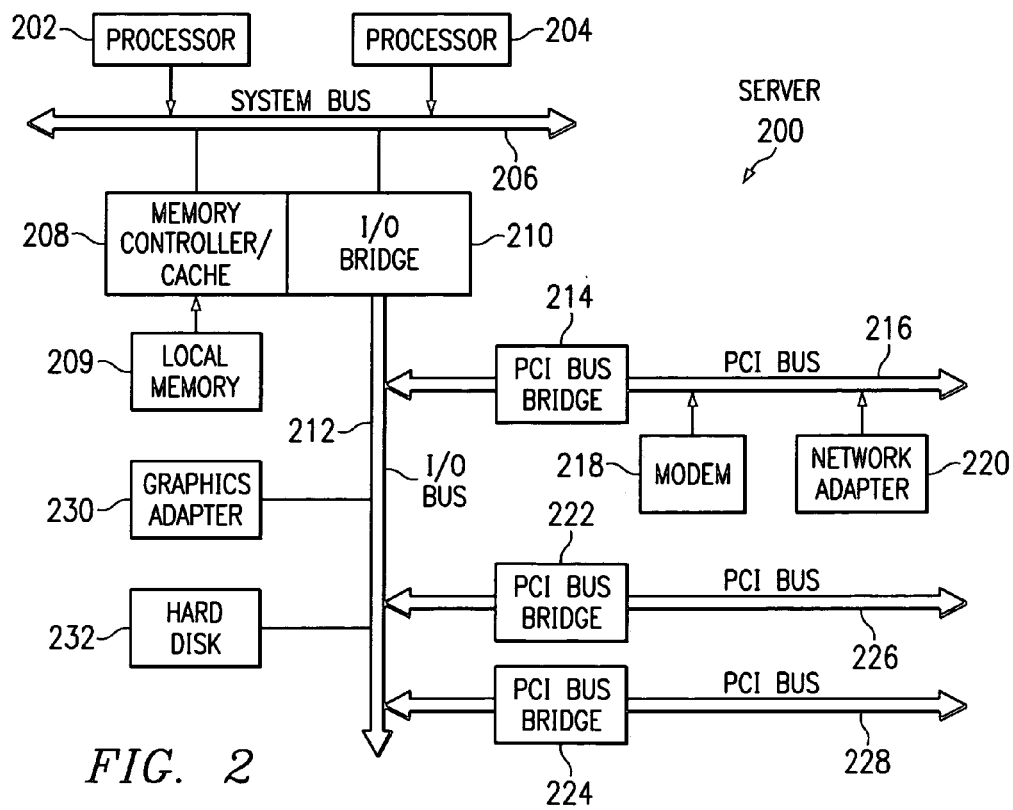
FIG. 2 is a block diagram depicts a data processing system that may be implemented as a server in accordance with a preferred embodiment of the present invention.

Referring to FIG. 2, a block diagram depicts a data processing system that may be implemented as a server, such as server 104 in FIG. 1, in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
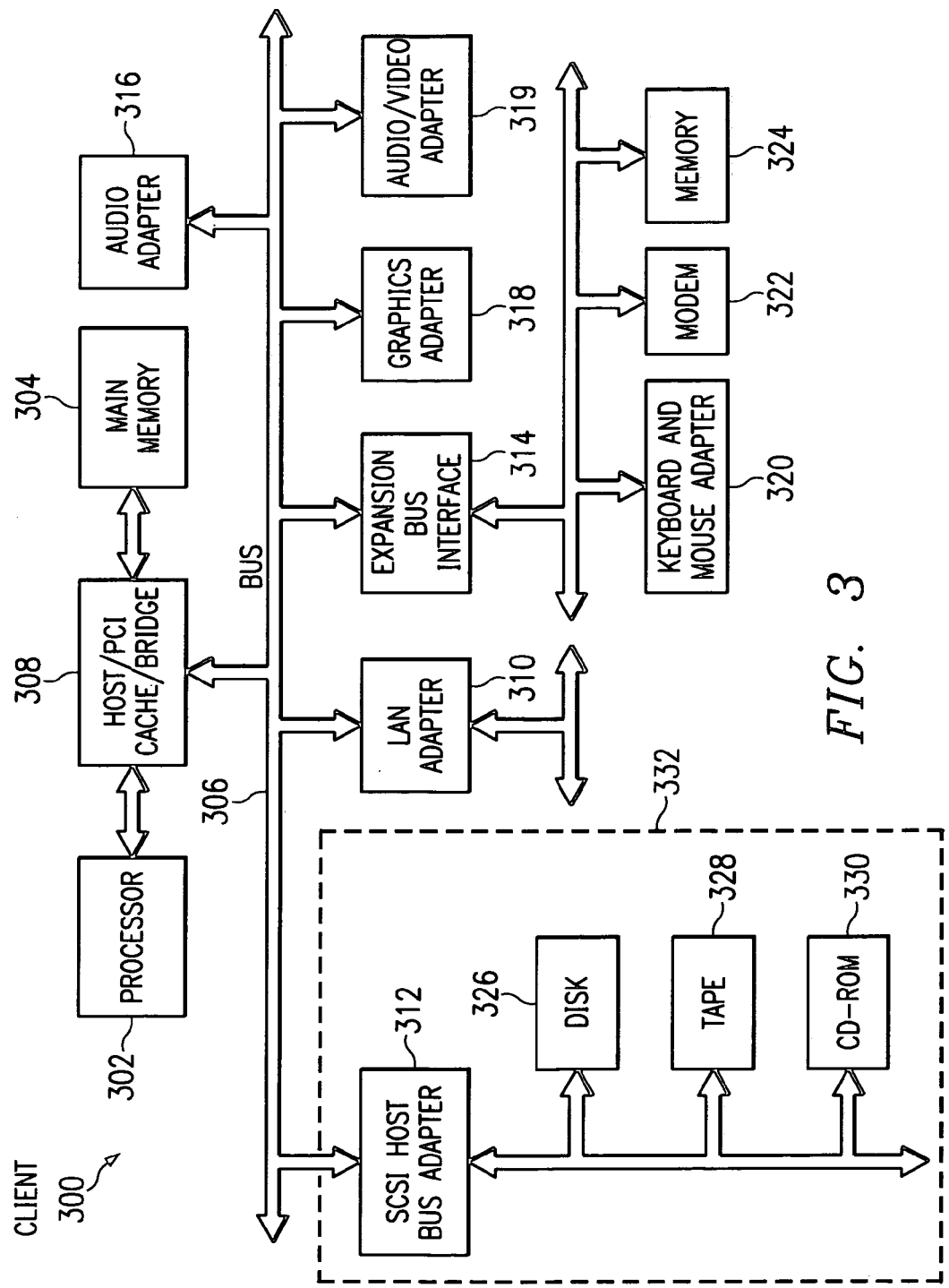
FIG. 3 is a block diagram illustrates a data processing system in which the present invention may be implemented.

With reference now to FIG. 3, a block diagram illustrates a data processing system in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture(ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system such as Java may run in conjunction with the operating system and provides calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

For example, data processing system 300, if optionally configured as a network computer, may not include SCSI host bus adapter 312, hard disk drive 326, tape drive 328, and CD-ROM 330, as noted by dotted line 332 in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides a method, apparatus, and instructions for outputting content from a Web page or set of Web pages to an output device. The present invention allows for a user to print a Web page and a selected number of other pages linked to this page, directly or indirectly, on lower levels. In particular, the mechanism of the present invention receives a request to print a particular Web page. This Web page is printed along with all other Web pages located on selected levels below the particular Web page. The number of levels below the selected Web page may be selected by a user or may be based on a default value. The environment in which the mechanism operations is discussed in more detail below.

Figure 4:
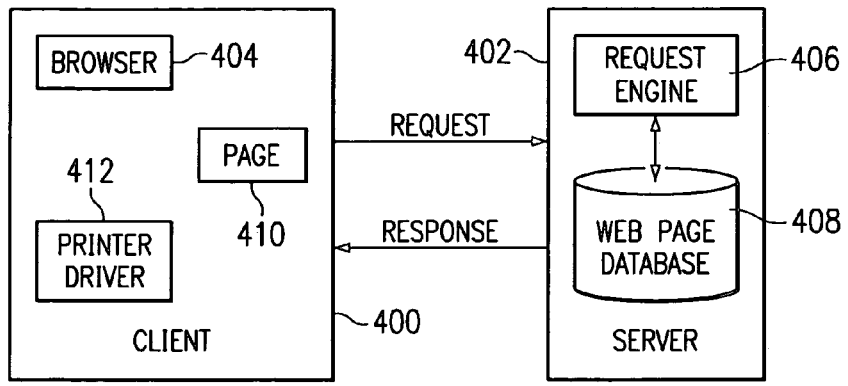
FIG. 4 is a diagram illustrating a print process depicted in accordance with a preferred embodiment of the present invention.

With reference now to FIG. 4, a diagram illustrating a print process is depicted in accordance with a preferred embodiment of the present invention. In this example, the user at client 400 requests pages from a server 402. Specifically, requests are generated using a browser 404. As used herein a browser is a client application that enables a user to view content in distributed data processing system. In these examples, a Web browser is illustrated, allowing HTML documents on the World Wide Web, another network, or the user's computer to be viewed. Also, browser 404 may be used to follow hyperlinks in the documents among them as well as transfer files. Browser 400 includes a connection that can handle IP packets as well display graphics that are in the document, play audio and video files, and execute small programs, such as Java applets, that can be embedded in HTML documents. Some Web browsers use helper applications or plug-ins to accomplish one or more of these tasks.

The request is received at a request engine 406 located in server 402. Request engine 406 queries Web page database 408 for a Web page matching the request from client 400. A Web page 410 matching the request in Web page database 408 is returned to browser 404 in client 400 via request engine 406. In this example, the user at client 400 may decide to print Web page 410 using browser 404. This Web page is printed using printer driver 412 in this example. Furthermore, Web page 410 may be actually printed at a printer located remotely from client 400. The mechanism of the present invention identifies all of the links within Web page 410 and retrieves those pages for printing. The retrieved pages may be parsed or reviewed for links. The pages to these links also may be retrieved for printing. Each successive Web page is considered another level. In these examples, the number of levels may be set by the user or through a default value. This printing of Web pages is also referred to as Web page link printing. The mechanism of the present invention may be implemented in a number of places. For example, the mechanism may be implemented as a plug-in in a Web browser or as a print driver. A "plug-in" is a small software program that plugs into a larger application to provide added functionality. Alternatively, the mechanism may be located on a server, which returns all of the pages to a client for printing in response to a request to print a Web page.

Figure 5A:
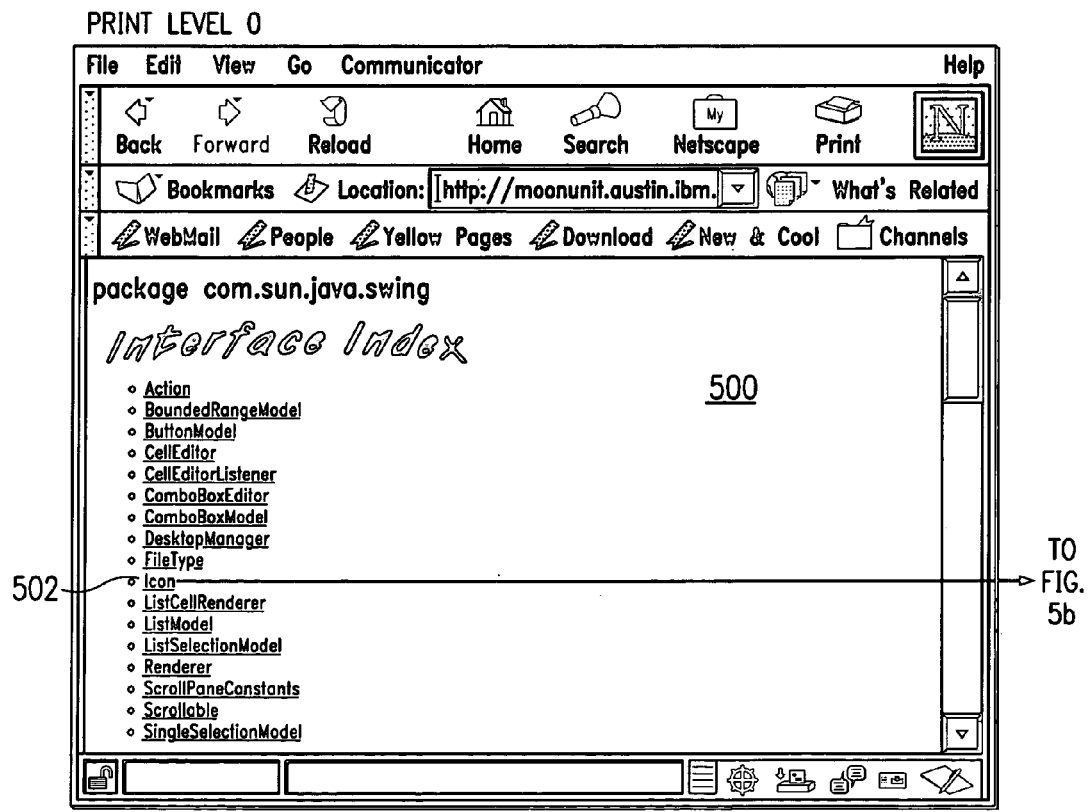
FIGS. 5a and 5B are diagrams illustrating printing of Web pages depicted in accordance with a preferred embodiment of the present invention.
Figure 5B:
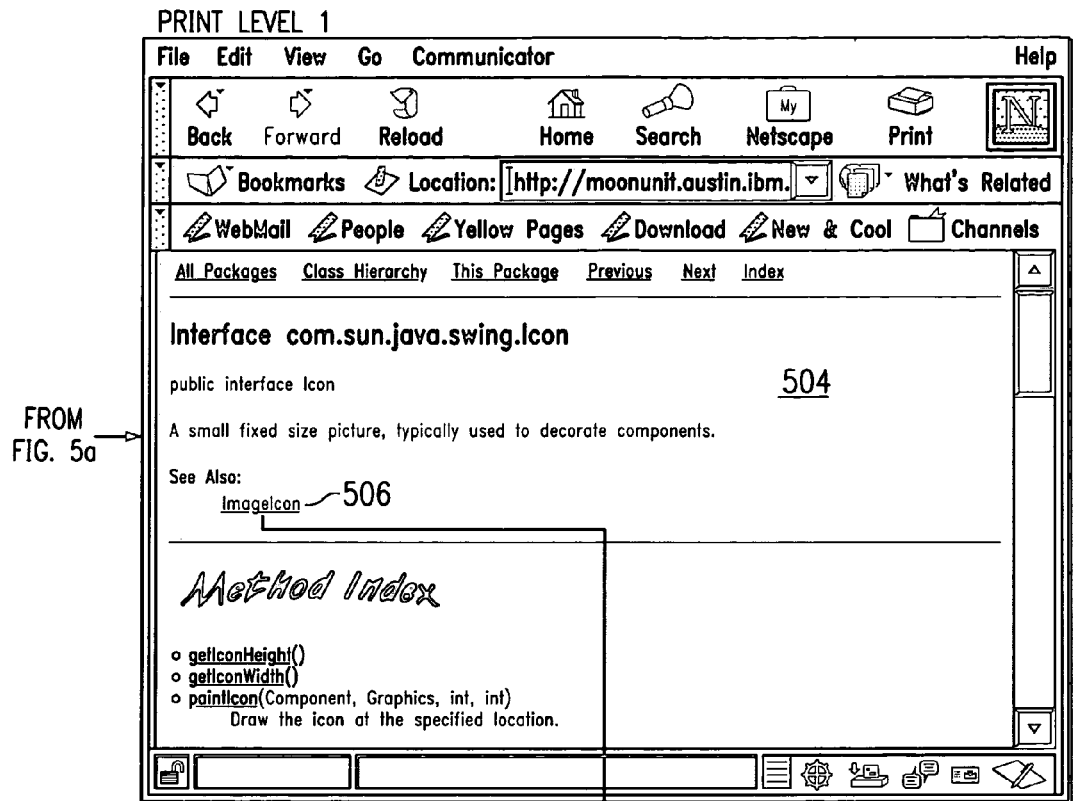
Figure 5B:
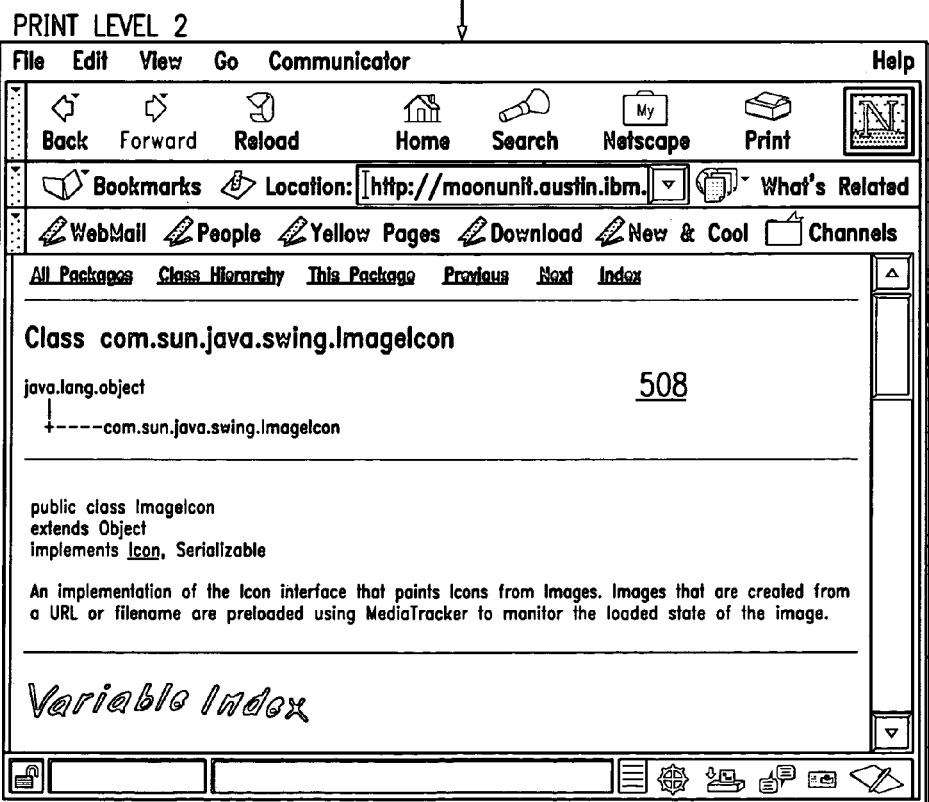

Turning now to FIGS. 5a and 5B, diagrams illustrating printing of Web pages is depicted in accordance with a preferred embodiment of the present invention. In this example, a Web page 500 is selected for printing using the mechanism of the present invention. Web page 500 is at level 0 in this example. Link 502 in Web page 500 is identified and Web page 504 in FIG. 5B is retrieved as the content associated with link 502. Web page 504 is identified as being in level 1 in this example. In FIG. 5B, Link 506 in Web page is identified and Web page 508 in FIG. 5B is retrieved. Web page 508 is at level 2.

Each of these Web pages, Web pages 500, 504, and 508 may be printed as they are retrieved or after all of the pages have been retrieved. Only one link is identified for each level below level 0 for printing in relation to the Web pages. Of course in actual practice, all of links for each Web page on each level are identified with the associated Web pages being retrieved for printing.

Figure 6:
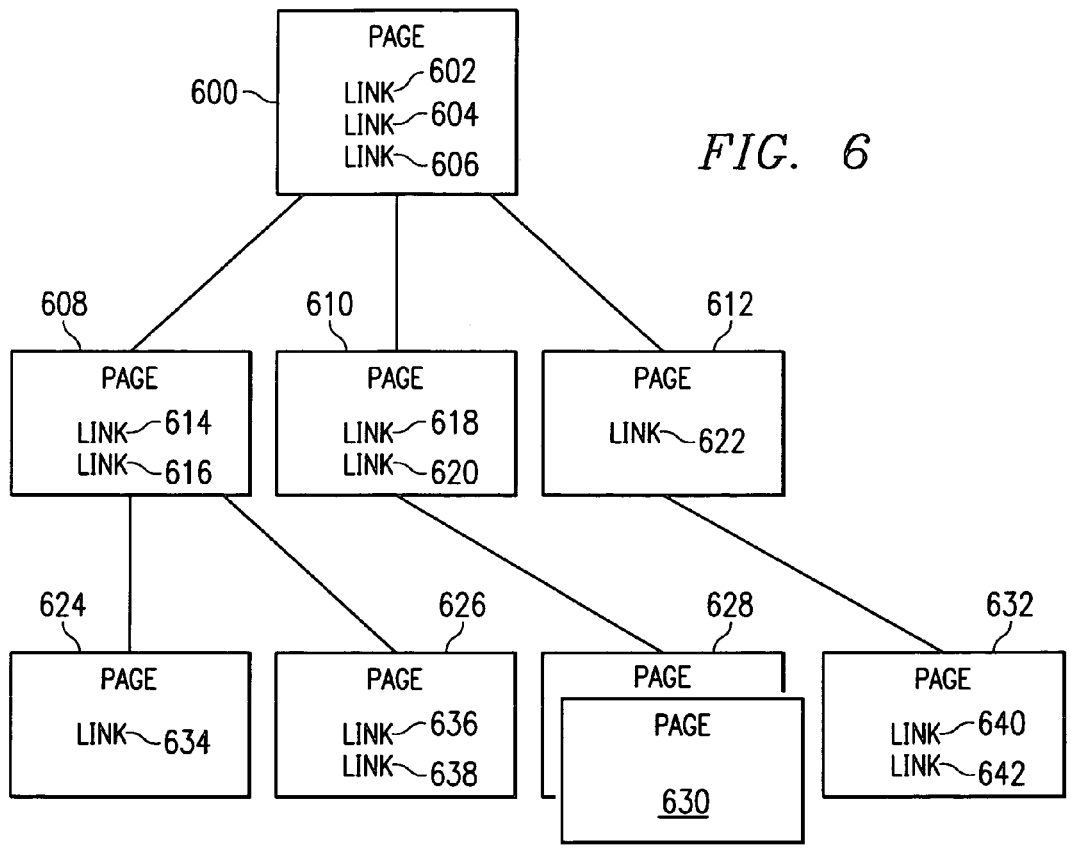
FIG. 6 is a diagram illustrating Web page link. printing depicted in accordance with a preferred embodiment of the present invention.

Turning next to FIG. 6, a diagram illustrating Web page link printing is depicted in accordance with a preferred embodiment of the present invention. In this example, a user has selected Web page 600 for printing along with printing associated Web pages two levels down from Web page 600.

Web page 600 is located at level 0 and contains three links 602–606. These three links are associated with Web pages 608–612. Web pages 608–612 are located on level 1 in this example. Web page 608 is accessed using link 602, Web page 610 is accessed using link 604, and Web page 612 is accessed using link 606. Web page 608 contains links 614 and 616. Web page 610 contains links 618 and 620. Web page 612 contains a single link, link 622.

Level 2 contains Web pages 624–632. Web page 624 is accessed using link 614 in Web page 608. Web page 626 is accessed using link 616 in Web page 608. Web pages 628 and 630 are accessed using links 618 and 620 in Web page 610. Web page 632 is accessed using link 622 in Web page 612. Web pages 624, 626, and 632 contain links 634–642. The pages associated with these links are not retrieved because they are located on a level lower than the one specified by the user. Also, in this example, Web page 632 contains a link returning to a previous level. In particular, link 640 in this example is tied to link 604 in Web page 600. The mechanism of the present invention does not process the link such that a recursive loop occurs. The tracking of prior paths may be performed in a number of ways. For example, all links that have been selected for printing may be stored in a hash table in which each entry contains a URL and a file name. If the mechanism of the present invention identifies a link that matches an entry into hash table, this link is not retrieved or printed. The prior path is identified and remains unfollowed.

Using the mechanism of the present invention, all of the Web pages on levels 0–2 are printed in response to a selection of page 600 for printing. The other pages are retrieved and printed without the user having to select each link for each page and printing a page after it has been retrieved. Instead, the user is able to select a single page and a depth or level to which printing should occur.

Additionally, the present invention also may allow a user to select selected pages on different levels for printing. For example, a user may see twenty links on a page, but choose not to print all twenty of the pages below. In such a case, the user may select a subset of the links for printing. Only those selected links would be traversed by the mechanism of the present in printing pages.

Figure 7:
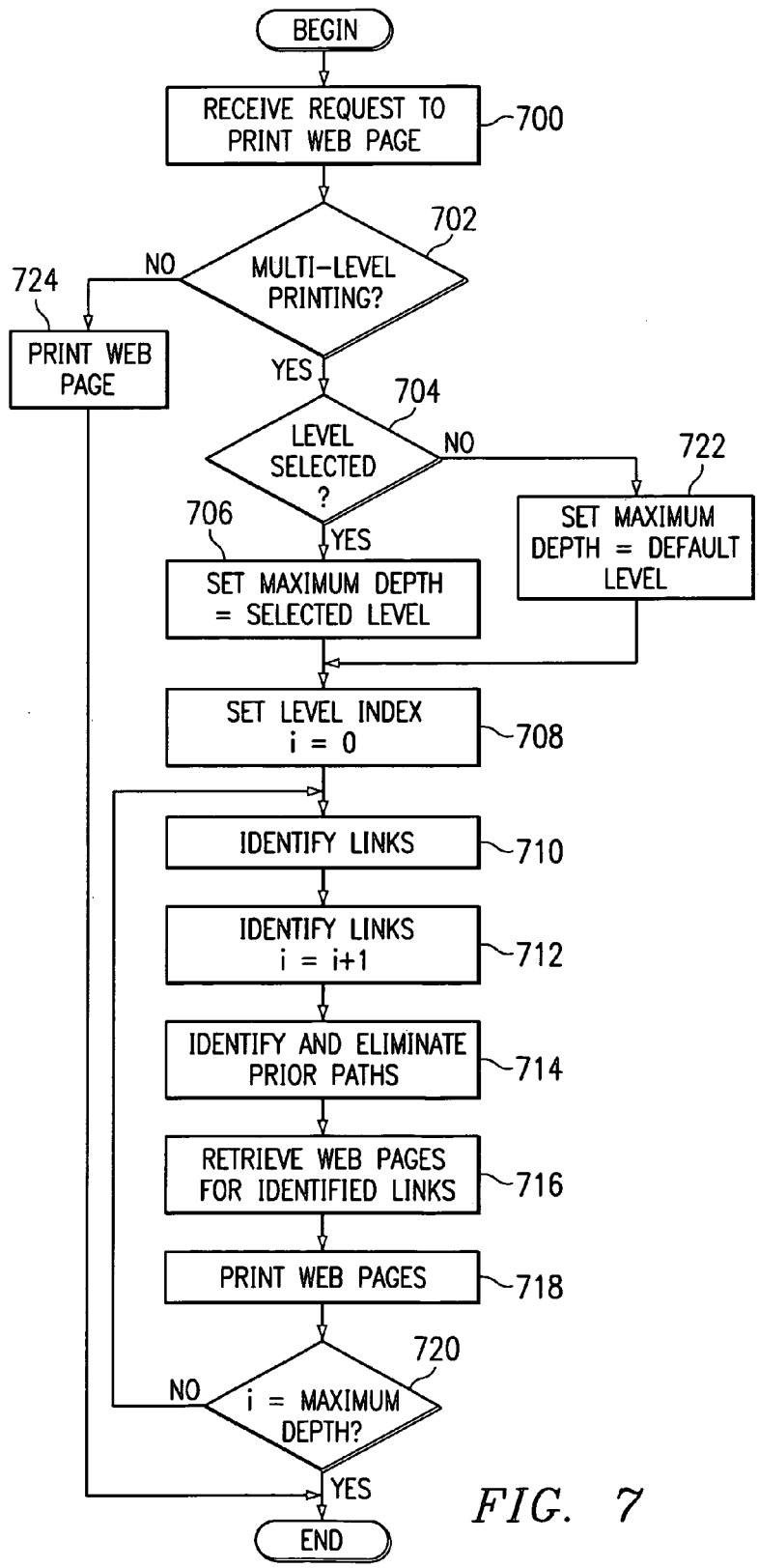
FIG. 7 is a flowchart of a process for Web page link printing depicted in accordance with a preferred embodiment of the present invention.

With reference now to FIG. 7, a flowchart of a process for Web page link printing is depicted in accordance with a preferred embodiment of the present invention. The process begins by receiving a request to print a Web page (step 700). A determination is made as to whether multi-level printing is to be performed (step 702). This determination is made in response to a user input. For example, a prompt may be displayed to the user asking whether mulit-level printing is to be performed. If multi-level printing is to occur, a determination is then made as to whether a level has been selected (step 704). The level may be selected by a prompt to the user or through some other input mechanism. If a level has been selected, the maximum depth is set equal to the selected level (step 706). A level index i is set equal to zero (step 708).

The process then identifies links in each of the retrieved Web pages (step 710). In the first pass, only a single Web page is present. This page is the Web page selected by the user for printing. On subsequent passes, more than one page may be present for printing. The index i is incremented by one (step 712). Thereafter, prior paths are identified and eliminated (step 714). This step is used to prevent the process from being stuck in a recursive loop. Paths to pages previously accessed are ignored using step 714.

Next, Web pages are retrieved for the identified links (step 716). The Web pages are then printed (step 718). The first pass through step 718 includes printing the Web page selected by the user. Thereafter, a determination is made as to whether the index i is equal to the maximum depth (step 720). If the index i is equal to the maximum depth, the process terminates. Otherwise, the process returns to step 710.

With reference again to step 704, if the level was not selected by the user, the maximum depth is set equal to a default value (step 722) with the process then proceeding to step 708 as described above. Turning back to step 702, if multi-level printing has not be selected, the Web page identified in the request back in step 700 is printed (step 724) with the process terminating thereafter.

Figure 8:
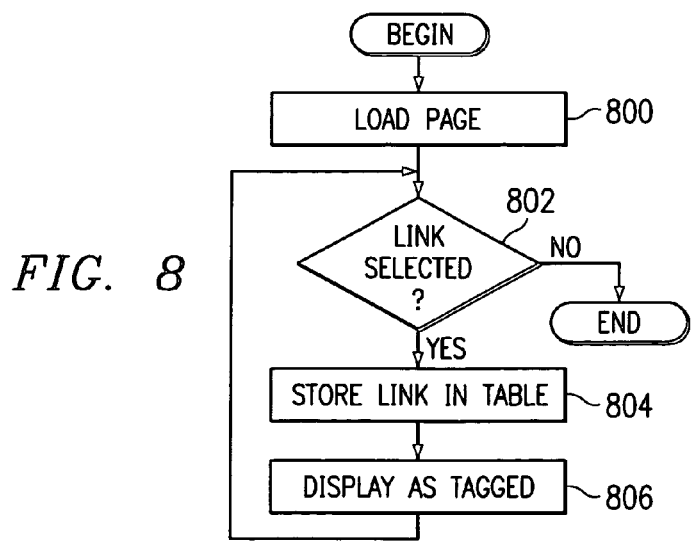
FIG. 8, a flowchart of a process for selecting and printing links is depicted in accordance with a preferred embodiment of the present invention.

With reference now to FIG. 8, a flowchart of a process for selecting and printing links is depicted in accordance with a preferred embodiment of the present invention. The process begins by loading a page for display to the user (step 800). Thereafter, a determination is made as to whether a link has been selected by the user for printing (step 802). If a link has been selected, the link is stored in a table (step 804). Thereafter, the link is displayed in a "tag" form (step 806) with the process returning to step 802. This display of link may be using some symbol in association with the link or by highlighting the link or displaying the link in a different color. With reference again to step 802, if no more links are selected, the process then terminates. The process in FIG. 8 generates a table of links that may be used in the process illustrated in FIG. 7. In such a case, each link that has been tagged or selected by the user is treated as a separate request to print a Web page. Alternatively, the process may be implemented such that only links selected by a user are retrieved and printed.

Thus, the present invention provides an improved method and apparatus for printing content, such as Web pages having links or associations with other Web pages. A depth or level of printing is selected for the content and all of the content down to the selected level is retrieved and printed. The mechanism of the present invention may be applied to other content other than Web pages. Files identified by links in Web pages also may be retrieved and printed. Further, content located in tree structures, such as files in directories arranged in a hierarchical fashion, may be printed using the mechanism of the present invention. In such a case, a directory or file may be selected for printing. Files located in subdirectories are identified and retrieved for printing.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. For example, the mechanism of the present invention may be located in various components. One location is as a plug-in in a Web browser. Another location may be as a print driver that is selectable by the user when the user desires to perform multi-level printing. In such a case, the "print driver" would perform the step necessary to identify content on lower levels, retrieve the content, and print the content. The printing may be accomplished by directing the content to a typical print driver, such as one for a laser printer. Additionally, the content may be output to other output devices other than a printer. For example, the content may be directed to a display or even to a file. The embodiment was chosen and described in order to best explain the principles of the invention the practical application and to enable others of ordinary skill in the art to understand the invention for various embodiments with various modifications as are suited to the particular use contemplated.

What is claimed is:

1. A method in a data processing system for printing web pages, the method comprising the data processing system implemented steps of:

receiving a request to print a web page; and printing the web page and each web page associated with the web page;

wherein the printing stop automatically and individually prints each of a plurality of web pages associated with the web page on selected levels below the web page; and wherein if a first web page of the plurality appears more than once among the plurality, said first web page is only printed once.

2. The method of claim 1, wherein the printing, stop comprising:

sending the web page and each web page associated with the web page on selected levels below the web page to a printer.

3. The method of claim 1, wherein the printing step comprising:

sending the web page and each web page associated with the web page on selected levels below the web page to a display device.

4. The method of claim 1, wherein the printing step comprising:

sending the web page and each web pace associated with the web page on selected levels below the web page to a file.

5. The method of claim 1, wherein the data processing system is a client computer.

6. The method of claim 1, wherein the data processing system is a web server.

7. A method in a data processing system for printing web pages, the method comprising the data processing system implemented steps of:
responsive to an input selecting a current web page for printing, determining whether a maximum depth for printing has been reached;
identifying a set of universal resource identifiers located within the current web page in response to the maximum depth being unreached;
retrieving the web page identified by the set of uniform resource locators; and
printing each web page retrieved;
wherein each web page retrieved is represented in a hash table, and wherein if a web page appears more than once in the hash table, said web page is only printed once.

8. The method of claim 7 further comprising:
repeating the determining, identifying, retrieving, and printing steps for each web page until the maximum depth has been reached.

9. The method of claim 7, wherein the printing step comprises sending each web page to an output device.

10. The method of claim 9, wherein the output device is a printer.

11. The method of claim 9, wherein the output device is a display device.

12. The method of claim 7, wherein the data processing system is a client computer.

13. The method of claim 7, wherein the data processing system is a web server.

14. The method of claim 7, wherein the determining, identifying, and retrieving steps are performed in a web server and wherein the printing step is performed in a client computer.

15. A method for printing items comprising the data processing system implemented steps of:
receiving a request to print a current item, wherein additional items are associated with the current item in relationship in which the additional items are on levels below the current item;
printing the current item;
determining whether additional items on levels below the current item are to be printed; and
responsive to a determination that additional items are to be printed, printing the additional items;
wherein if a first item appears more than once among the additional item, the first item is only printed once.

16. The method of claim 15, wherein the items are web pages associated using universal resource identifiers.

17. The method of claim 15, wherein the items are files associated using directories.

18. A data processing system for printing web pages, the data processing system comprising:
receiving means for receiving a request to print a web page; and
printing means for printing the web page;
wherein the printing means automatically and individually prints each of a plurality of web pages associated with the web page on selected levels below the web page; and wherein if a first web page of the plurality appears more than once among the plurality, said first web page is only printed once.

19. The data processing system of claim 18, wherein the printing means comprises:
sending means for sending the web page and each web page associated with the web page on selected levels below the web page to a printer.

20. The data processing system of claim 18, wherein the printing means comprises:
sending means for sending the web page and each web page associated with the web page on selected levels below the web page to a display device.

21. The data processing system of claim 18, wherein the printing means comprises:
sending means for sending the web page and each web page associated with the web page on selected levels below the web page to a file.

22. The data processing system of claim 18, wherein the data processing system is a client computer.

23. The data processing system of claim 18, wherein the data processing system is a web server.

24. A data processing system for printing web pages, the data processing system comprising:
determining means, responsive to an input selecting a current web page for printing, for determining whether a maximum depth for printing has been reached;
identifying means for identifying a set of universal resource identifiers located within the current web page in response to the maximum depth being unreached;
retrieving means for retrieving the web page identified by the set of uniform resource locators; and
printing means for printing each web page retrieved;
wherein each web page retrieved is represented in a hash table, and wherein if a web page appears more than once in the hash table, said web page is only printed once.

25. The data processing system of claim 24 further comprising:
repeating the determining means, identifying means, retrieving means, and printing means for each web page until the maximum depth has been reached.

26. The data processing system of claim 24, wherein the printing means comprises sending each web page to an output device.

27. The data processing system of claim 26, wherein the output device is a printer.

28. The data processing system of claim 26, wherein the output device is a display device.

29. The data processing system of claim 24, wherein the data processing system is a client computer.

30. The data processing system of claim 24, wherein the data processing system is a web server.

31. The data processing system of claim 24, wherein the determining means, identifying means, and retrieving means are performed in a web server and wherein the printing means is performed in a client computer.

32. A computer program product in a computer readable medium for printing web pages, the computer program product comprising:
first instructions for receiving a request to print a web page; and
second instructions for printing the web page and each web page associated with the web page on selected levels below the web page;
wherein each web page to be printed is represented in a hash table, and wherein if a given web page appears in the hash table more than once, the given web page is only printed once.

33. A computer program product in a computer readable medium for printing web pages, the computer program product comprising:

first instructions, responsive to an input selecting a current web page for printing, for determining whether a maximum depth for printing has been reached;

second instructions for identifying a set of universal resource identifiers located within the current web page in response to the maximum depth being unreached;

third instructions for retrieving the web page identified by the set of uniform resource locators; and fourth instructions for printing each web page retrieved;

wherein each web page retrieved is represented in a hash table, and wherein if a web page appears more than once in the hash table, said web page is only printed once.

34. The method of claim 1, wherein web pages selected for printing are represented in a hash table, and wherein if a web page matches an entry in the hash table, that web page is not printed.

* * * * *